(12) United States Patent
Harris

(10) Patent No.: US 7,536,517 B2
(45) Date of Patent: May 19, 2009

(54) DIRECT-UPDATE SOFTWARE TRANSACTIONAL MEMORY

(75) Inventor: Timothy L. Harris, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 482 days.

(21) Appl. No.: 11/192,784

(22) Filed: Jul. 29, 2005

(65) Prior Publication Data

US 2007/0028056 A1 Feb. 1, 2007

(51) Int. Cl.
*G06F 12/00* (2006.01)
*G06F 13/00* (2006.01)
*G06F 13/28* (2006.01)
*G06F 17/30* (2006.01)

(52) U.S. Cl. .......................... 711/150; 711/147; 707/8; 707/9

(58) Field of Classification Search .................. 711/150
See application file for complete search history.

(56) References Cited

U.S. PATENT DOCUMENTS 5,983,225 A * 11/1999 Anfindsen ....................... 707/8
6,856,993 B1 * 2/2005 Verma et al. ................. 707/101

OTHER PUBLICATIONS

Minwen Ji, Alistair Veitch, John Wilkes, "Seneca: remote mirroring done write", Proceedings of USENIX Technical Conference (San Antonio, TX), pp. 253-268, Jun. 2003. USENIX, Berkeley, CA.*

M. Herlihy and J. Eliot B. Moss, Transactional Memory: Architectural Support for Lock-Free Data Structures, Proceedings of the Twentieth Annual International Symposium on Computer Architecture, 1993, pp. 289-300, IEEE.
Nir Shavit and Dan Touitou, Software Transaction Memory, Paper, Copyright 1995, pp. 204-213, ACM, Inc., Canada.
M. Herlihy, V. Luchangco, M. Moir and W.N. Scherer III, Software Transactional Memory for Dynamic-Sized Data Structure, Paper, 2003, pp. 92-101, PODC Jul. 13-16, 2003, Sun Microsystems, Inc., Boston, Massachusetts.
V.J. Marathe, W.N. Scherer III, and M.L. Scott; Adaptive Software Transactional Memory, Technical Report #868, May 2005, pp. 1-15, Dept. of Computer Science, University of Rochester; Rochester, New York.
T. Harris and K. Fraser, Language Support for Lightweight Transactions, Paper, Proceedings of the 18th Annual ACM SIGPLAN conference on Object-oriented programming, systems, languages, and applications, Oct. 2003, pp. 388-402, ACM Press, New York, New York.

(Continued)

*Primary Examiner*—Kevin L Ellis
*Assistant Examiner*—Ryan Bertram

(57) ABSTRACT

A transactional memory programming interface allows a thread to directly and safely access one or more shared memory locations within a transaction while maintaining control structures to manage memory accesses to those same locations by one or more other concurrent threads. Each memory location accessed by the thread is associated with an enlistment record, and each thread maintains a transaction log of its memory accesses. Within a transaction, a read operation is performed directly on the memory location, and a write operation is attempted directly on the memory location, as opposed to some intermediate buffer. The thread can detect inconsistencies between the enlistment record of a memory location and the thread's transaction log to determine whether the memory accesses within the transaction are not reliable and the transaction should be re-tried.

24 Claims, 7 Drawing Sheets

OTHER PUBLICATIONS

R. Ennals, Cache Sensitive Software Transactional Memory (regular paper), 2005, 11 pages, Intel Research, Cambridge, United Kingdom.

K. Fraser, Practical Lock-Freedom, Technical Report No. 579, Feb. 2004, 116 pages, University of Cambridge—Computer Laboratory, Cambridge, United Kingdom.

T. Harris and K. Fraser, Revocable Locs For Non-Blocking Programming, Proceedings of the tenth ACM SIGPLAN Symposium on Principles and Practice of Parallel Programming, Jun. 2005, pp. 72-82, ACM Press, New York, New York.

T. Harris, S. Marlow, S. Peyton Jones, and M. Herlihy, Composable Memory Transactions, Paper, Presented to Principles and Practice of Parallel Programming ACM SIGPLAN Symposium, Dec. 18, 2004, pp. 48-60, ACM Press, New York, New York.

M. Herlihy and J. Eliot B. Moss, Transactional Memory: Architectural Support for Lock-Free Data Structures, Paper, Dec. 1, 1992, 41 pages, Digital Equipment Corporation and Cambridge Research Laboratory, Cambridge, Massachusetts.

* cited by examiner

US 7,536,517 B2

DIRECT-UPDATE SOFTWARE TRANSACTIONAL MEMORY

TECHNICAL FIELD

The invention relates generally to computer memory operations, and more particularly to direct-update software transactional memory.

BACKGROUND

It is common for multiple threads of a multi-thread process to share common memory locations during concurrent execution. Consequently, two different threads of a multi-threaded program may read and update the same memory location accessible by the program. However, care must be taken to ensure that one thread does not modify a value of the shared memory location while the other thread is in the middle of a sequence of operations that depend on the value.

For example, suppose that a program is accessing the contents of two different software objects, wherein each object represents an amount of money in a different bank account. Initially, the amount of the first account is $10, stored at memory address A1, while the amount of the second account is $200, stored at memory address A2. A first thread of a banking program is coded to transfer $100 from A2 to A1 and a second thread is coded to calculate the total amount of funds in both accounts. The first thread may start by adding $100 to the contents of A1, updating it to $110, and then proceed to subtract $100 from the contents of A2, updating it to $100. However, if the second thread executes between these two operations, then the second thread may compute an incorrect total of $310 for both accounts, rather than the correct total of $210.

A software transactional memory provides a programming abstraction through which a thread can safely perform a series of shared memory accesses, allowing the thread to complete its transaction without interference from another thread. Accordingly, transactional memories can be employed in software to ensure that the transaction including the exemplary addition and subtraction operations of the first thread is "atomic" as to the memory locations A1 and A2, and therefore the second thread will compute the correct total amount in both accounts.

However, existing approaches for implementing transactional memories in software suffer from performance problems. For example, in one existing approach, when a thread accesses a sequence of memory locations within a transaction, the thread maintains a separate list of the memory locations and values it wishes to read and update (i.e., write to) during the transaction and then, at the end of the transaction, the thread updates all of these values at the actual shared memory locations. If, during the transaction, the thread wants to re-read or re-write to any memory location in its list, the thread must search for the memory location's entry in the list to access the entry, which is a slow proposition programmatically. Accordingly, this indirect method of implementing a transactional memory in software suffers from poor performance.

SUMMARY

Implementations described and claimed herein address the foregoing problems by providing a transactional memory programming interface that allows a thread to directly and safely access one or more shared memory locations within a transaction while maintaining control structures to manage memory accesses to those same locations by one or more other concurrent threads. Each memory location accessed by the thread is associated with an enlistment record, and each thread maintains a transaction log of its memory accesses. Within a transaction, a read operation is performed directly on the memory location, and a write operation is attempted directly on the memory location, as opposed to some intermediate buffer. If the thread detects an inconsistency between the enlistment record of a memory location and its transaction log, the thread determines that the memory accesses within the transaction are not reliable and the transaction should be re-tried. Furthermore, if the thread attempts to write to a memory location within a transaction and determines that another thread has already updated the memory location within another, uncompleted transaction, the first thread can either wait and retry the transaction later or can attempt to resolve the contention with the other thread. In addition, the thread may maintain an undo log of its write memory accesses during the transaction, including the original value and the address of the location, to allow the thread to undo these operations in the event that the transactions is aborted.

In some implementations, articles of manufacture are provided as computer program products. One implementation of a computer program product provides a computer program storage medium readable by a computer system and encoding a computer program. Another implementation of a computer program product may be provided in a computer data signal embodied in a carrier wave by a computing system and encoding the computer program.

Other implementations are also described and recited herein.

DETAILED DESCRIPTION

Figure 1:
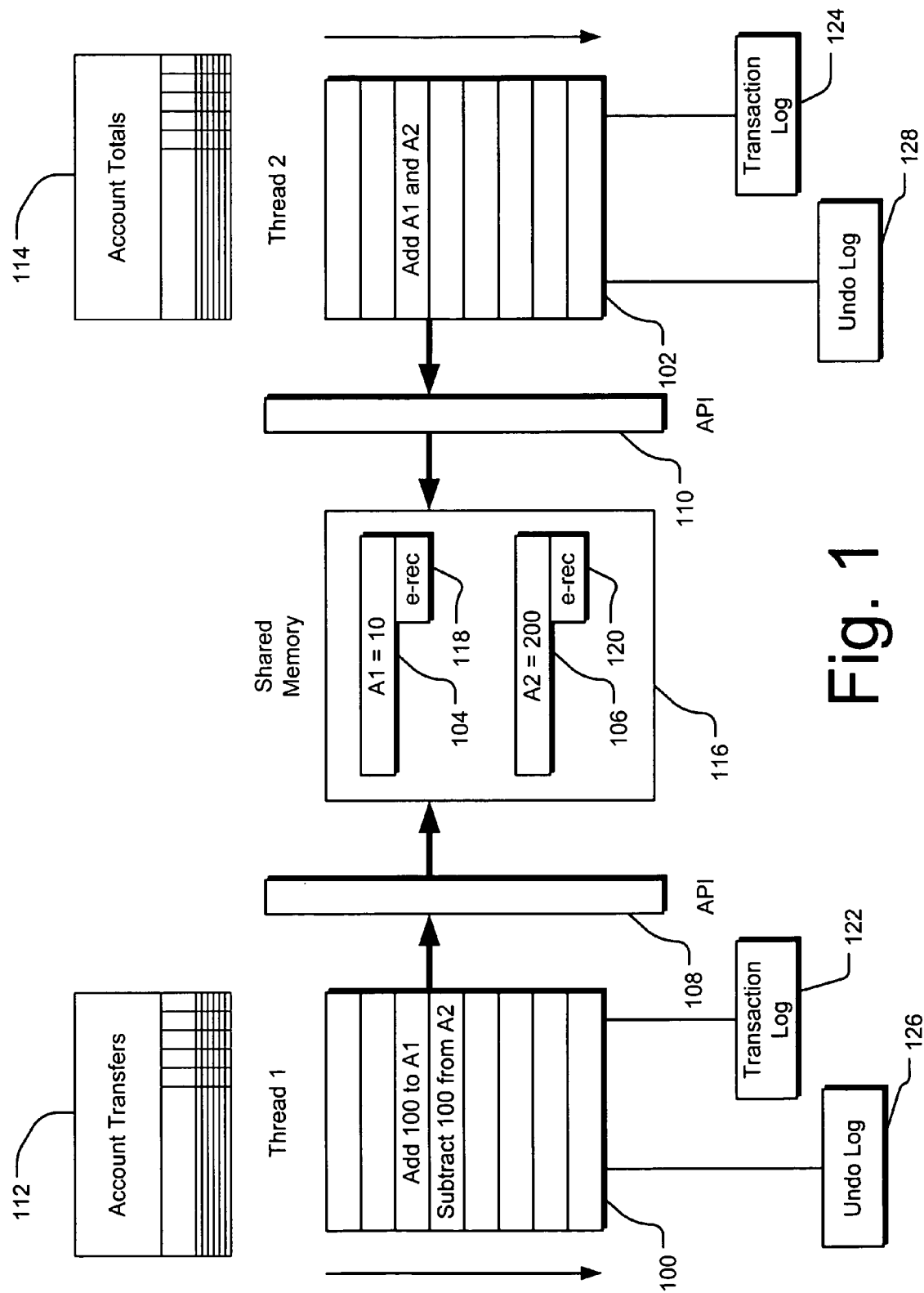
FIG. 1 illustrates two concurrent threads accessing shared memory locations via exemplary direct-update software transactional memory interfaces.

FIG. 1 illustrates two concurrent threads 100 and 102 accessing shared memory locations 104 and 106 via exemplary direct-update software transactional memory interfaces 108 and 110 (e.g., application programming interfaces or APIs). The thread 100, for example, represents a computation of bank account transfers (resulting in the report 112), and the thread 102, for example, represents a computation of a total of the two bank accounts (resulting in the report 114). The shared memory locations 104 (A1) and 106 (A2) reside in a shared memory region 116 and store values representing the amount of funds in two separate accounts, initially $10 and $200 respectively.

Each shared memory location can be associated with a range of memory addresses (e.g., an array, a list, a table, a software object, etc.) within the system. An enlistment record, such as e-rec 118 or e-rec 120, acts as a control structure for direct-update software transactional memory accesses is associated with each memory location. An enlistment record may be associated with a memory location in a variety of ways, one enlistment record for each memory location, one enlistment record for each software object, or one enlistment record for a block of memory locations, such as a page in the process's virtual address space. In one implementation, an enlistment record includes two fields: a version field and a scratch field, although the version field may also hold transaction identifiers. In another implementation, an enlistment record includes a single version field, although the version field may also hold transaction identifiers or transaction log pointers. Other enlistment record structures are also contemplated.

In the illustrated example, the thread 100 includes at least two atomic operations in a single transaction for transferring $100 from the first account, corresponding to memory address 104, to the second account, corresponding to memory location 106. A first operation adds 100 to the value corresponding to memory location 104 and a second operation subtracts 100 from the value corresponding to memory location 106 to effect the transfer. The concurrent thread 102 includes an atomic operation in a transaction for totaling the amounts in both accounts.

To ensure safe memory accesses for each transaction, the threads 100 and 102 access the shared memory locations 104 and 106 using the APIs 108 and 110. A thread performs read operations within a transaction through an API directly on a memory location, and at the completion of the transaction, receives a signal indicating whether the thread can rely on the results of the transaction. Likewise, a thread performs write operations within a transaction through the API directly on the shared memory location, provided another thread has not already marked a write operation to that shared memory location.

Figure 7:
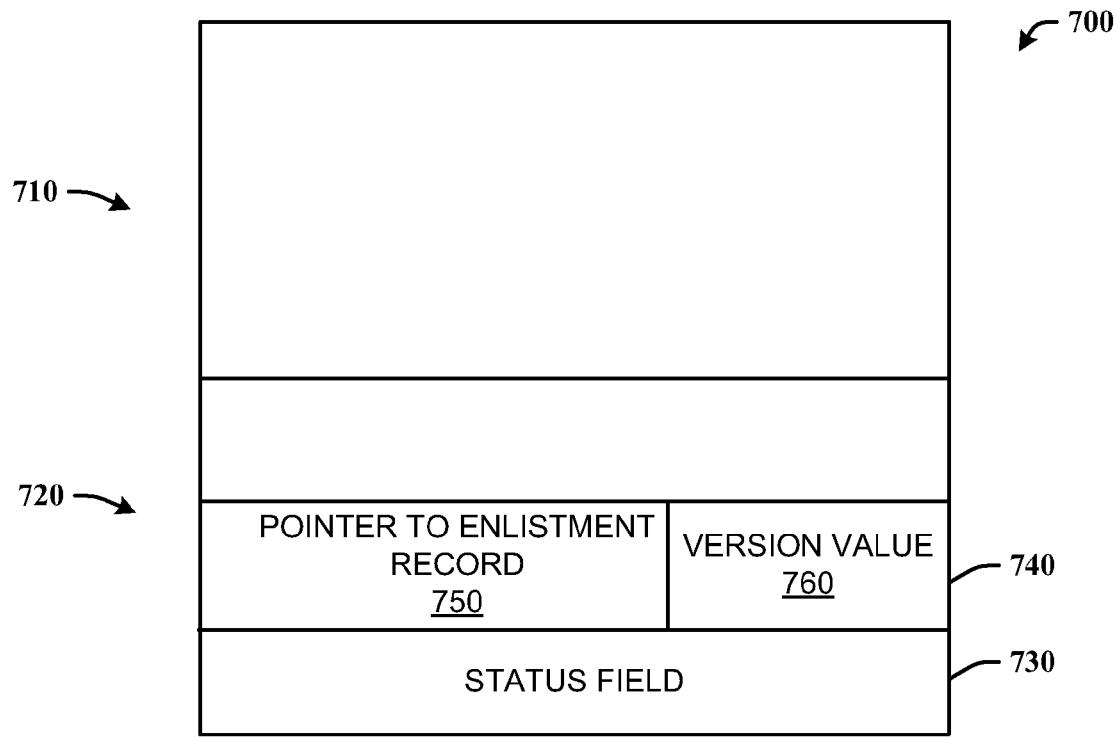
FIG. 7 illustrates an exemplary transaction log.

Referring to FIGS. 1 and 7, each thread maintains a transaction log 700 (e.g., transaction log 122 or transaction log 124) to manage its direct-update transactional memory accesses. In one implementation, a transaction log 700 has two component lists, one for reads 710 and one for updates 720. In an alternative implementation, a transaction log has a single list, with list entries being parameterized as "reads" or "updates". Each transaction log 700 also includes a status field 730, which holds a value indicating ACTIVE, ABORTED, or COMMITTED. Individual list entries 740 include a pointer (e.g., a reference) to an enlistment record of an associated memory address 750 and may also include a version value 760. In alternative implementation, a list entry may also include a scratch field. Another data structure, called an undo log, holds a list of memory addresses that have been updated within the transaction and their previous values (i.e., before the memory location was updated). In yet another implementation, a single log is used combining the functions of the transaction log and the update log, with list entries being parameterized as "read", "update" (or "write"), or "undo" entries.

Figure 8:
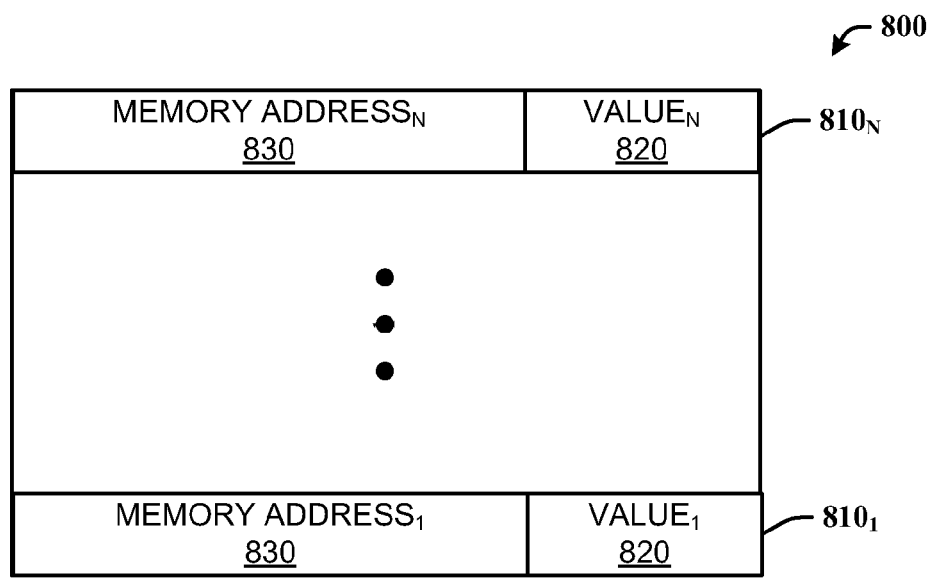
FIG. 8 illustrates an exemplary undo log.

Referring to FIGS. 1 and 8, each transaction also maintains an undo log 800 (126 and 128), which can be used to undo the memory write accesses of a given transaction. In one implementation, an undo log 800 records the original value 820 and memory address 830 associated with each write access 810 of the transaction. In this manner, if the transaction is aborted, then entries in the undo log can be executed in reverse order to restore the shared memory locations written to by the transaction to their pre-trans action states.

By following the protocol specified for the APIs 108 and 110, the threads 100 and 102 can safely perform sequences of memory accesses to shared memory locations within individual transactions without the risk of undetected interference by another thread.

Figure 2:
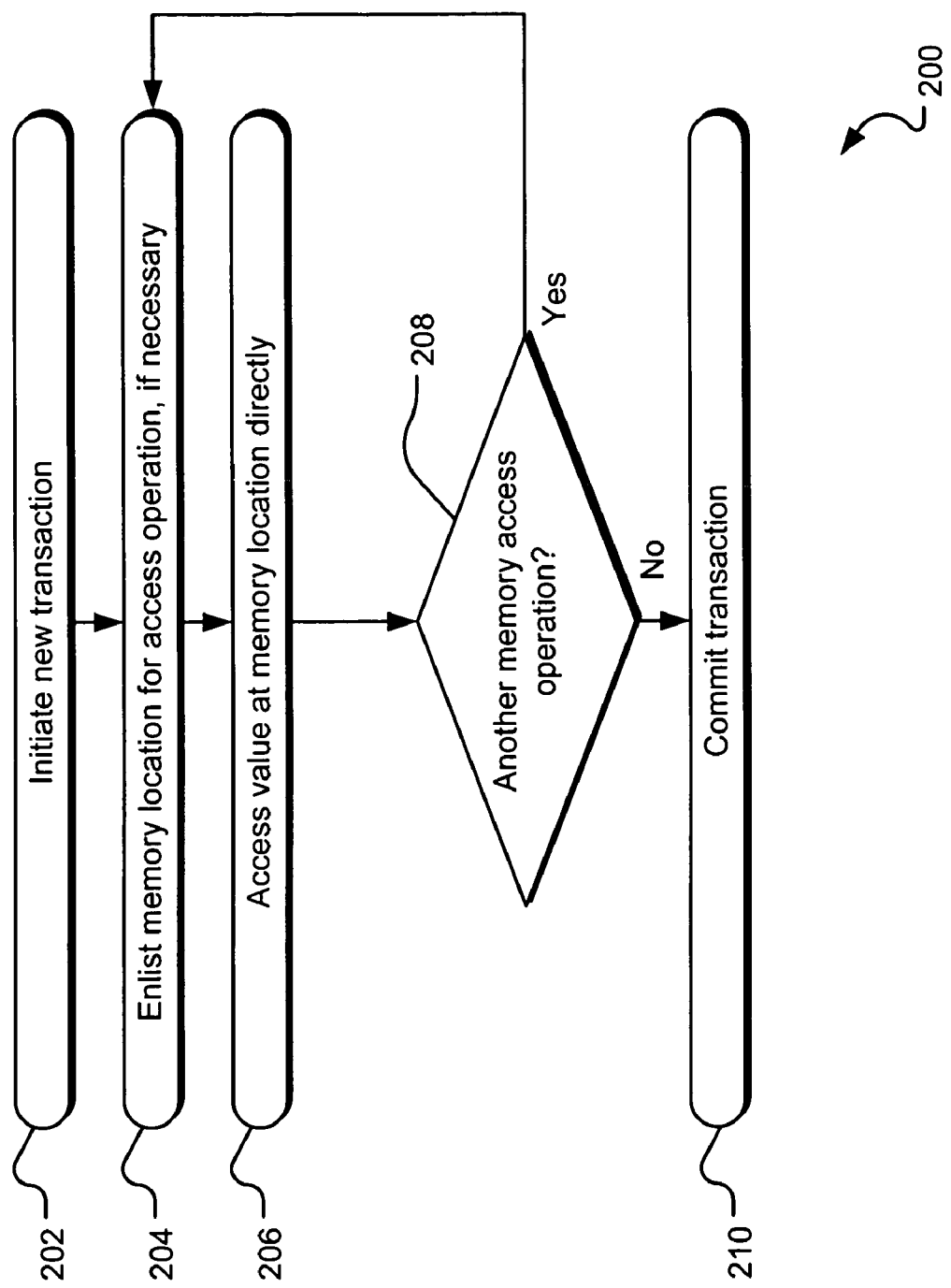
FIG. 2 illustrates operations for executing a memory access via an exemplary direct-update software transactional memory interface.

FIG. 2 illustrates operations 200 for executing a sequence of memory accesses within a transaction via an exemplary direct-update software transactional memory interface. The operations 200 represent calls made through the API by an individual thread accessing one or more shared memory locations. For example, a shared memory location may correspond to a software object for an individual bank account. Each shared memory location is associated with a memory address and an enlistment record at creation of the corresponding software object.

An initiation operation 202 initiates a new transaction for a thread. In one implementation, the initiation operation 202 is represented within an exemplary direct-update software transactional memory interface by a "TransactionStart( )" operation, which allocates and initializes a transaction log for the new transaction. The transaction log is maintained in local (i.e., non-shared) memory accessible by the thread. At initiation, the transaction log for a thread is empty and its status is set to ACTIVE. In one implementation, the initiation operation 202 also allocates and initializes a new undo log associated with the transaction.

An enlistment operation 204 enlists a specified memory location for a memory access operation, such as a read operation or a write operation. In one implementation, the enlistment operation 204 is represented within an exemplary direct-update software transactional memory interface by an "EnlistAddrForRead(Addr r)" operation, wherein the address r represents the address of the specified memory location. In another implementation, the enlistment operation 204 is represented within an exemplary direct-update software transactional memory interface by an "EnlistAddrForWrite(Addr r)" operation, wherein the address r represents the address of the specified memory location. A more detailed description of enlistment operations is provided below.

An access operation 206 performs a memory access to the specified memory location, such as by a read operation or a write operation. In one implementation, the access operation 206 is represented by a direct read to the specified memory location. In another implementation, the access operation 206 is represented within an exemplary direct-update software transactional memory interface by a "TransactionRead(Addr r)" operation, wherein the address r represents the address of the specified memory location and the operations reads the value directly from the specified memory location. In yet another implementation, the access operation 206 is represented by a direct write to the specified memory location. In this implementation, a separate UpdateUndo(Addr r) may also be employed to update an undo log (as discussed above). In yet another implementation, the access operation 206 is represented within an exemplary direct-update software transactional memory interface by a "TransactionWrite(Addr r, Value v)" operation, wherein the address r represents the address of the specified memory location, the value v represents the value to be written to the memory location, and the operation adds an entry to an undo log A decision operation 208 determines whether another memory access operation remains in the transaction sequence. If so, and the transaction has not previously accessed the specified memory location of the next memory access operation, the processing proceeds to the enlistment operation 204. Alternatively, the processing may bypass the enlistment operation 204 because the specified memory location has already been enlisted within the current transaction.

In any event, the processing steps through each memory access in the transaction sequence until no more memory access operations remain in the transaction sequence, at which time a commitment operation 210 attempts to commit the transaction. In one implementation, the commitment operation 210 is represented within an exemplary direct-update software transactional memory interface by a "TransactionCommit( )" operation. Generally, the commitment operation 210 determines whether all of the memory read operations within the transaction were completed within the transaction without an interfering update by another thread. If the commitment operation 210 fails, the thread determines that the transaction has failed and will retry the entire transaction, if appropriate. If the commitment operation 210 succeeds, then the thread determines that the transaction has completed successfully and that the thread can rely on the transaction results (e.g., the read values and the update operations). At the completion, the commitment operation 210 "stands down" the transaction's enlistments so that the associated memory locations become accessible to other threads. In one implementation, the standing-down is accomplished by iterating through the write transaction entries in the transaction log and, for each associated enlistment record, storing a new version number in the version field of the enlistment record (e.g., incrementing the version number) of an updated memory location.

It is possible to overrun the version numbers (e.g., all of the available numbers in the version field may have been used overtime). For example, if the version is incremented by one with each update (e.g., 0, 1, 2, 3, etc.) and eventually exceeds a maximum version number "N", then a mechanism to "rollover" or otherwise handle the overflow of the version number may be in order. In one implementation, if the number of transactions executed overtime exceeds N, then the transactions active at that point can be aborted. Alternatively, if the number of transactions executed overtime exceeds N, the transactions active at that point may be partially committed, such that invalid transactions are aborted and valid transactions remain active. In yet another implementation, the size N may be made so large that reasonable processes are extremely unlikely to exceed N.

An abort operation, which may be provided within an exemplary direct-update software transactional memory interface by a TransactionAbort( ) operation, abandons the current transaction associated with the current thread and rewinds any updates performed within the transaction prior to the abort event. In one implementation, the status field in current transaction log is set to ABORTED and the entries in the undo log are executed in reverse, restoring the pre-transaction values in the updated memory locations. Once the aborted transaction's updates are undone, the abort operation "stands down" the enlistments.

Figure 3:
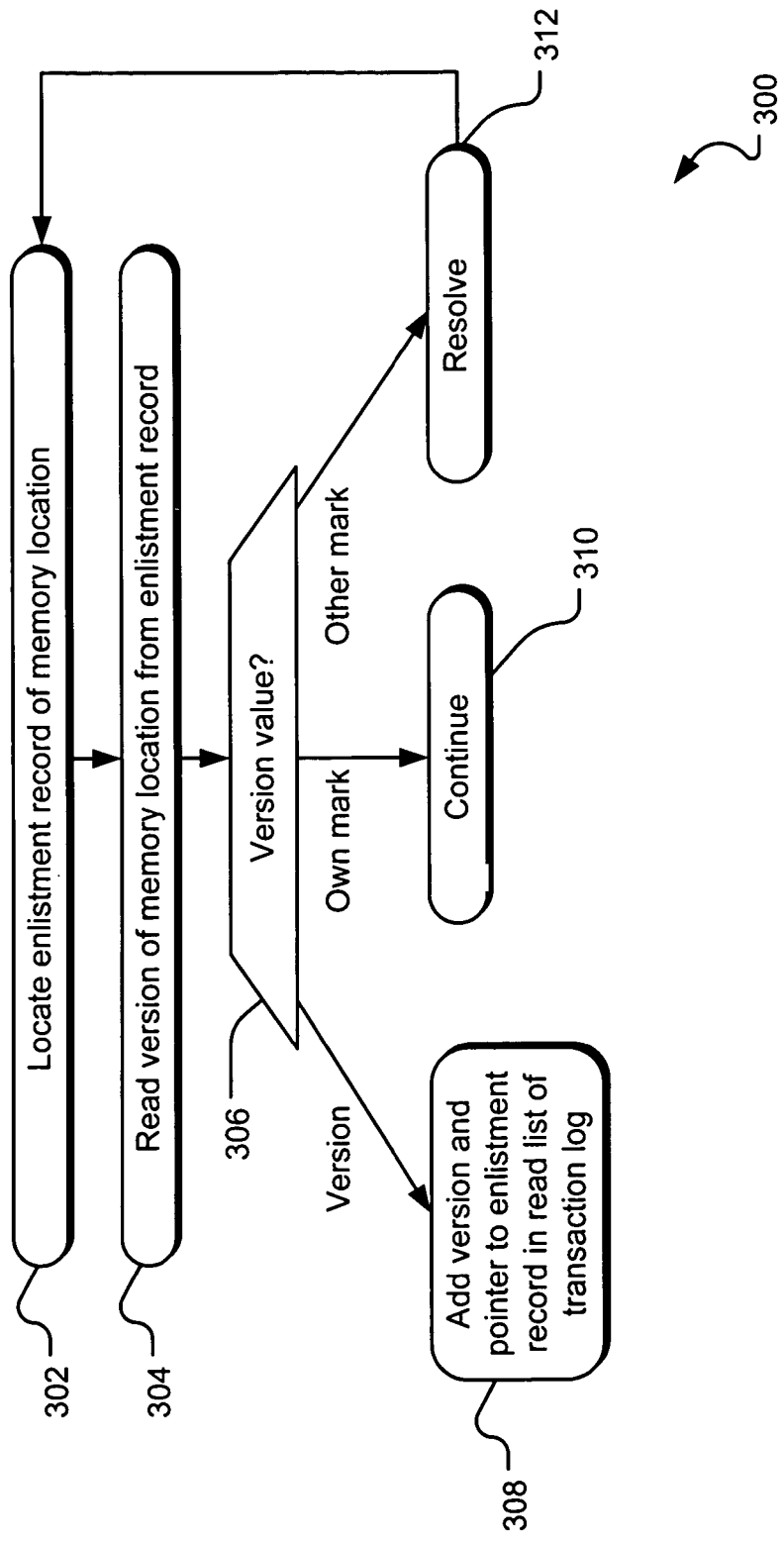
FIG. 3 illustrates exemplary operations for enlisting a read operation on a memory location within a transaction.

FIG. 3 illustrates exemplary operations 300 for enlisting a read operation on a memory location within a transaction. Responsive to a call by a thread to an enlistment-read operation (see discussion regarding FIG. 2) relative to a given memory address r, a locating operation 302 locates the enlistment record (i.e., "e-rec") associated with the memory address r. In one implementation, the enlistment record is a data structure associated with a memory address r (e.g., as part of a software object at the memory address r or as referenced by that software object).

A versioning operation 304 reads the version value associated with the memory address from the located enlistment record. A decision operation 306 determines whether the read version value actually represents a version, an identifier indicating the current transaction, or an identifier indicating another transaction. If the read version value represents a version, then a logging operation 308 adds the version and a pointer (e.g., a reference) to the located enlistment record to an entry in a read transaction list (e.g., a linked list) of the transaction log. The thread can then proceed to read the value at the memory address directly.

If the read version value represents an identifier written to the enlistment record of the memory address by the current transaction, then the transaction log has already been updated by a write operation in the current transaction and the thread can merely continue (as indicated by continuation operation 310) to read the value at the memory address directly. By continuing, the thread is acknowledging that a transaction log entry for the enlistment record has already been generated in the transaction log of the transaction. An identifier of a transaction may be an arbitrary, unique transaction identifier, a pointer (e.g., a reference) back to a scratch field in the transaction log, or some other unique identifier.

If the read version value represents an identifier written to the enlistment record of the memory address by another transaction, then the transaction log has already been updated by a write operation in the other transaction and the thread invokes a resolution operation 312 and then retries the enlistment. In one implementation, an exemplary resolution operation 312 is actually a no-op instruction, which would cause the enlistment operation to spin-wait. Alternatively, a mutual exclusion lock could be associated with the enlistment record to avoid spinning. In yet another alternative implementation, each transaction log could be associated with a revocable lock. In this implementation, the resolution operation of a later accessing transaction (T2) could acquire the revocable lock from the earlier transaction (T1). With the revocable lock, T2 could perform a TransactionAbort( ) on behalf of T1, and then release the revocable lock of T1. Thereafter, T2 could re-enlist the memory address r for its read operation, and T1 could be displaced to a recovery function that could raise an exception to indicate that T1 has been aborted and should be restarted at an appropriate point in processing.

In an alternative implementation, an EnlistAddrForRead( ) operation omits the decision operation 306 of the version value that it has read and just assumes the content of the version field in the enlistment record is a version. In this implementation, the TransactionCommit( ) operations catches any conflicts in a shared memory location, whether the conflict was caused by a version conflict or by reservation of the shared memory location by a write access of another thread).

Figure 4:
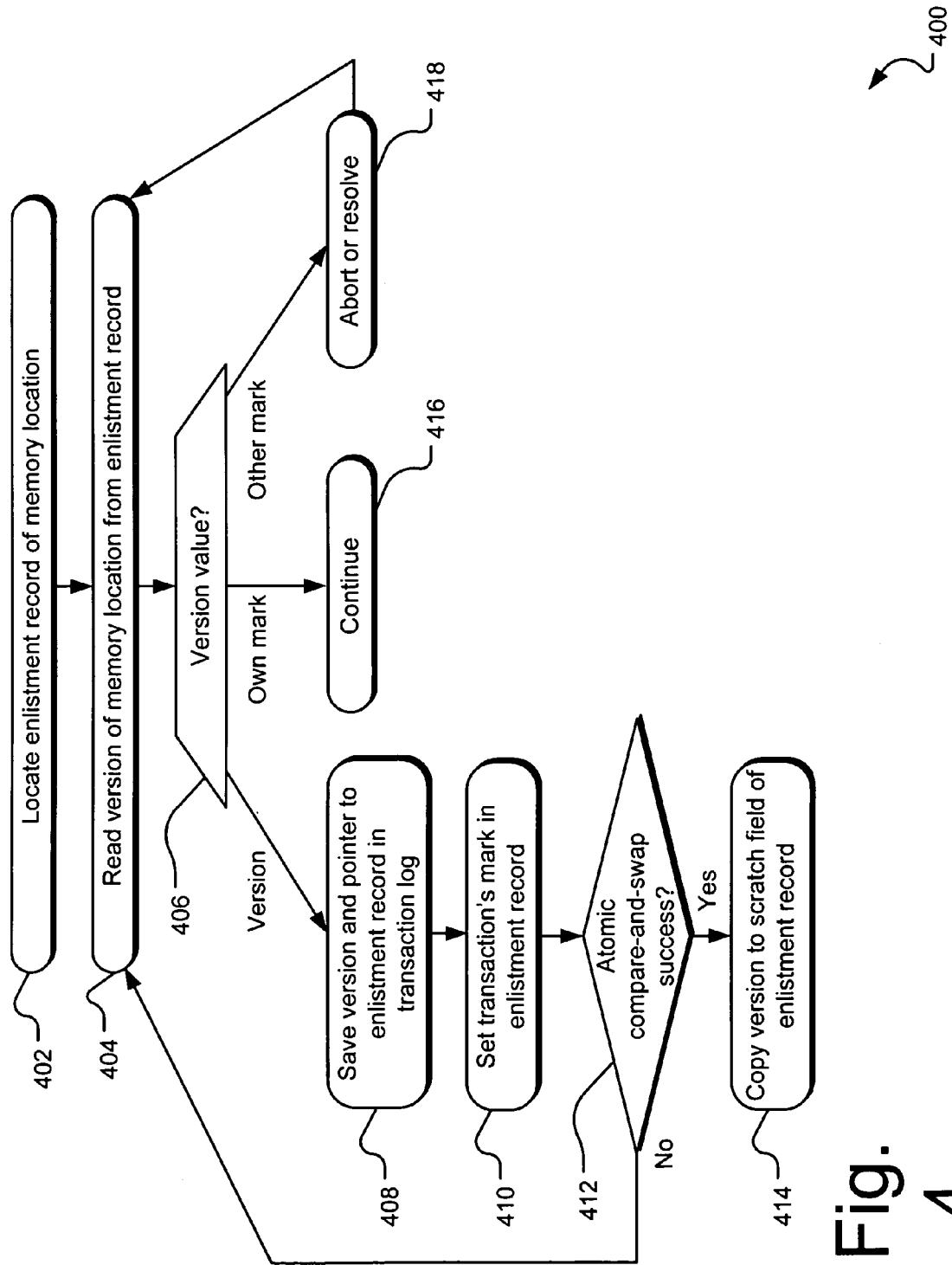
FIG. 4 illustrates exemplary operations for enlisting a write operation on a memory location within a transaction.

FIG. 4 illustrates exemplary operations 400 for enlisting a write operation on a memory location within a transaction. Responsive to a call by a thread to an enlistment-write operation (see discussion regarding FIG. 2) relative to a given memory address r, a locating operation 402 locates the enlistment record (i.e., "e-rec") associated with the memory address r. In one implementation, the enlistment record is a data structure associated the memory address r (e.g., as part of a software object at the memory address or as referenced by the software object).

A versioning operation 404 reads the version value associated with the memory address from the located enlistment record. A decision operation 406 determines whether the read version value actually represents a version, an identifier indicating the current transaction, or an identifier indicating another transaction. If the read version value represents a version, then a logging operation 408 adds the version and a pointer (e.g., a reference) to the located enlistment record to an entry in a write transaction list (e.g., a linked list) of the transaction log. A marking operation 410 uses an atomic compare-and-swap operation to set a mark designating the current transaction in the version field of the enlistment record of the memory address r, thereby temporarily reserving the memory address r (and associated memory location, range of memory locations, object, etc.) for the current transaction. If the compare-and-swap operation succeeds (as determined by decision operation 412), the version value saved in the write transaction list within the transaction log is written to a scratch field of the enlistment record, and then the thread can then proceed to update the value at the memory address directly. Alternatively, if the compare-and-swap operation fails, the version and pointer (e.g., a reference) to the located enlistment record are deleted from the write transaction list within the transaction log and enlistment is attempted again in locating operation 402.

In one implementation, the scratch field may be included in a transaction entry, instead of an enlistment record. In this implementation, a transaction identifier in a version field of the enlistment record is a pointer (e.g., a reference) into the transaction entry. In this manner, a quick compare-and-swap operations may be employed, and the version scratch is stored in local, unshared memory, only for updated memory locations in a transaction.

If the read version value represents an identifier written to the enlistment record of the memory address by the current transaction, then the transaction log has already been updated by a write operation in the current transaction and the thread can merely continue (as indicated by continuation operation 416) to update the value at the memory address directly. If the read version value represents an identifier written to the enlistment record of the memory address by another transaction, then the transaction log has already been updated by a write operation in the other transaction. As such, the thread invokes a resolution operation 418 and then retries the enlistment. Exemplary resolution operations have already been discussed with regard to resolution operation 418.

Figure 5:
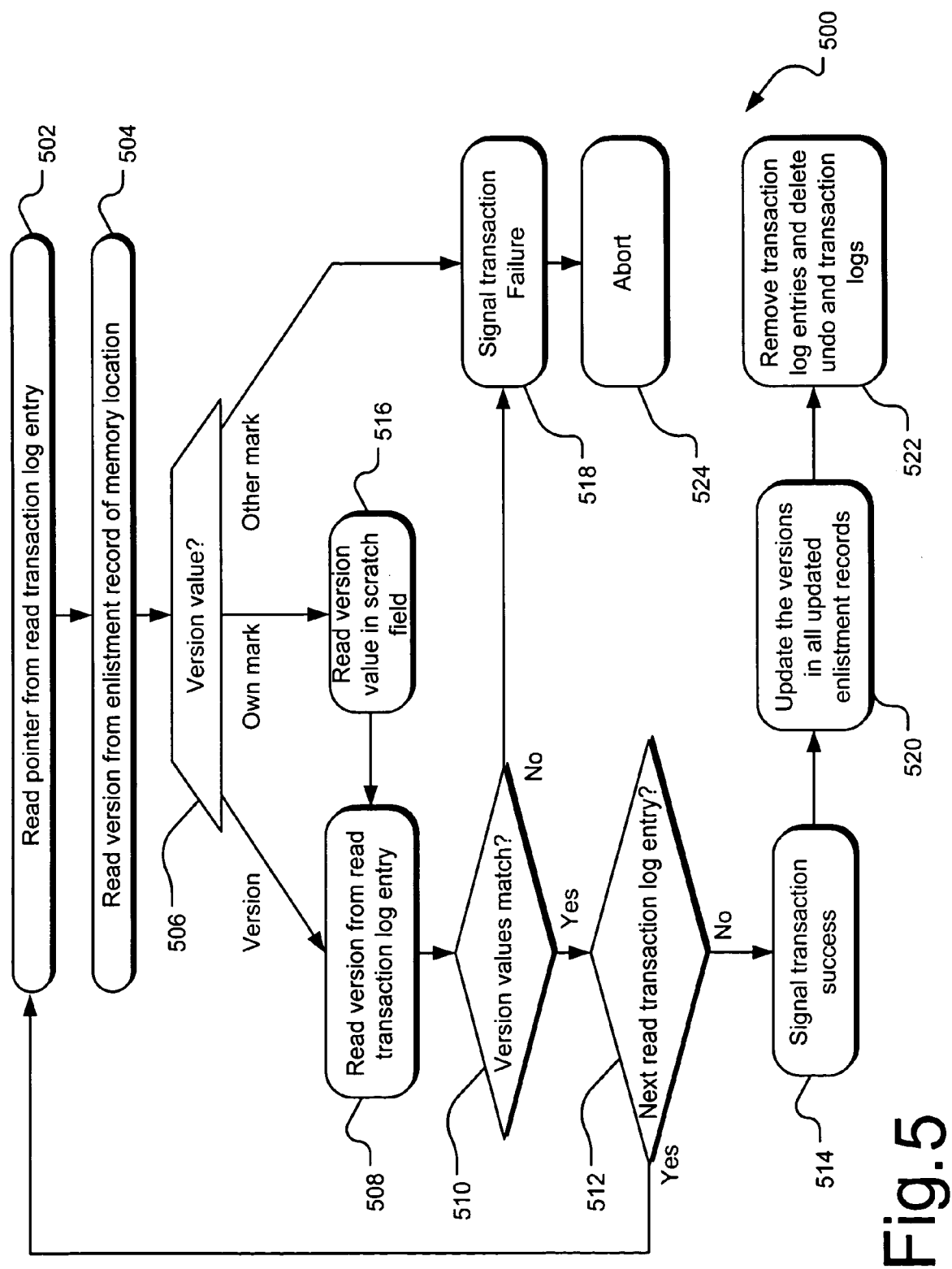
FIG. 5 illustrates exemplary operations for committing a transaction in a direct-update software transactional memory interface.

FIG. 5 illustrates exemplary operations 500 for committing a transaction in a direct-update software transactional memory interface. A log entry operation 502 reads the pointer (e.g., a reference) from an entry in the read transaction list of the transaction log. Using this pointer, an enlistment record operation 504 reads the version field of the enlistment record associated with the memory address. A decision operation 506 determines whether the value read from the version field actually represents a version, a mark indicating the current transaction, or a mark indicating another transaction.

If the value read from the version field is actually a version, a read operation 508 reads the version from the transaction log entry from which the pointer (e.g., a reference) was read in log entry operation 502. If the two versions match (as determined by decision operation 510), the thread may still be able to complete successfully because the memory address associated with the current log entry was not updated by another thread during the transaction. If this is true for all log entries in the read transaction list, all reads within the current transaction to that memory address are valid and the transaction may be valid.

A decision operation 512 determines whether a next transaction log entry exists in the read transaction list. If so, processing proceeds to log entry operation 502. Otherwise, a success operation 514 signals a success from the commitment operation and sets the status of the current transaction log to COMMITTED. A versioning operation 520 updates the version values of all enlistment records associated with write transaction list entries to indicate that a transaction completed successfully in association with that memory location. A termination operation 522 removes all transaction log entries from the transaction log and deletes the transaction log itself.

If the decision operation 510 determines that the versions do not match, the mismatch indicates that the reads to the memory location are not valid because the memory address was updated by another thread during the current transaction. In this case, processing proceeds to a failure operation 518, which signals a failure of the commitment operation. Furthermore, an abort operation aborts the transaction, as described above.

If the decision operation 506 determines that the value read from the version field of the enlistment record actually represents an identifier indicating the current transaction, a reading operation 516 reads a version value from a scratch field. In one implementation, the scratch field is part of the enlistment record of the memory address. In an alternative implementation, the scratch field is stored in an entry in the transaction log. Processing then proceeds to the read operation 508 and the decision operation 510 to compare the version from the scratch field to the version in the transaction log.

If the decision operation 506 determines that the value read from the version field of the enlistment record actually represents an identifier indicating another transaction, the update to the memory address is precluded by an update of another concurrent transaction. Therefore, the failure operation 518 signals a transaction failure. Furthermore, an abort operation aborts the transaction, as described above.

Figure 6:
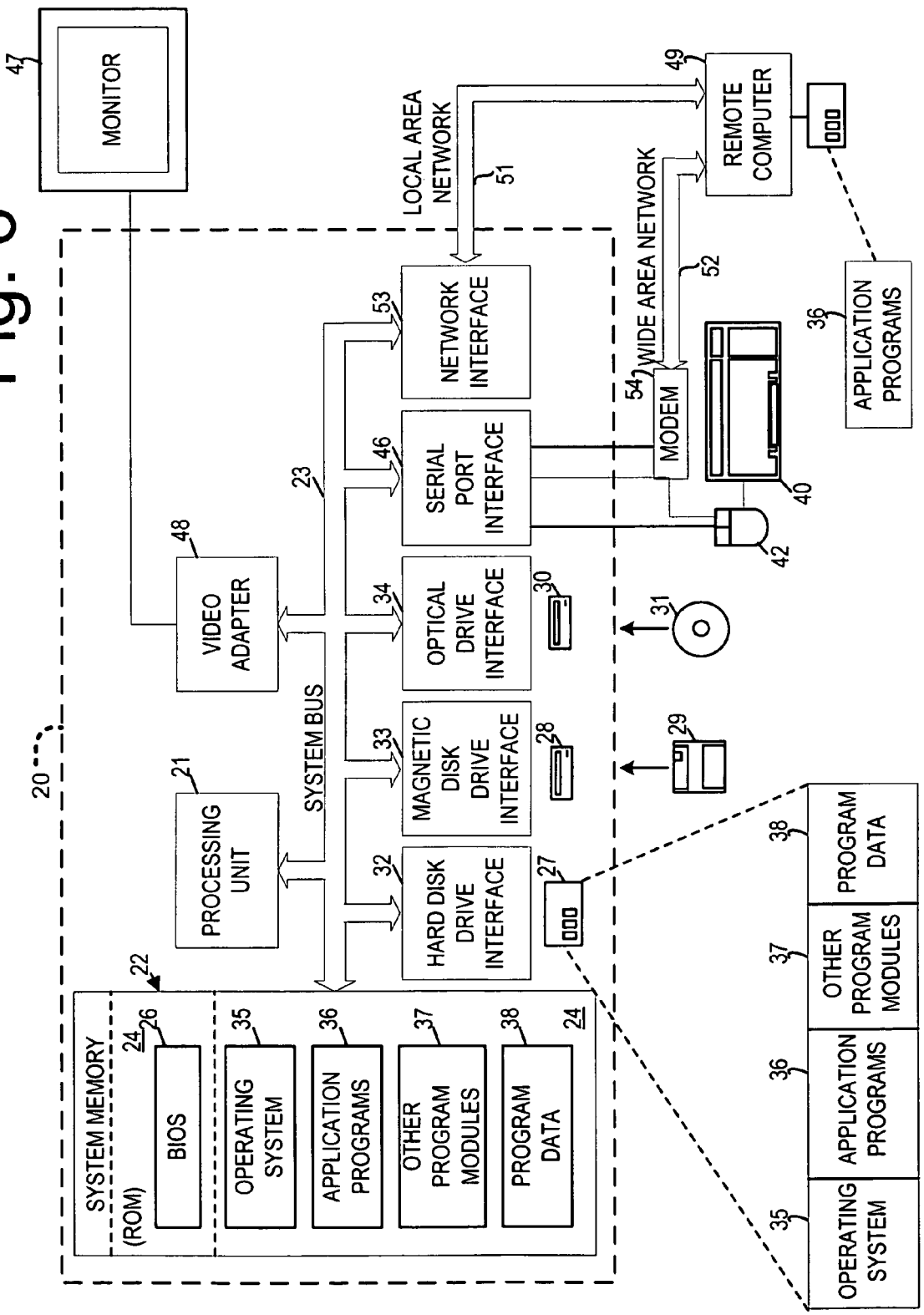
FIG. 6 illustrates a system that may be useful in implementing the described technology.

The exemplary hardware and operating environment of FIG. 6 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other-optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 6. The logical connections depicted in FIG. 6 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

In an exemplary implementation, a TransactionStart( ) module, an EnlistAddrForRead( ) module, an EnlistAddrForWrite( ) module, a TransactionRead( ) module, a TransactionWrite( ) module, a TransactionAbort( ) module, a TransactionCommit( ) module, and other modules may be incorporated as part of the operating system 35, application programs 36, or other program modules 37. Transaction logs, enlistment records, and other data may be stored as program data 38.

The technology described herein is implemented as logical operations and/or modules in one or more systems. The logical operations may be implemented (1) as a sequence of processor-implemented steps executing in one or more computer systems and (2) as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

The above specification, examples and data provide a complete description of the structure and use of exemplary embodiments of the invention. Since many embodiments of the invention can be made without departing from the spirit and scope of the invention, the invention resides in the claims hereinafter appended. In particular, it should be understood that the described technology may be employed independent of a personal computer. Other embodiments are therefore contemplated.

What is claimed is:

1. A method of managing memory access to a shared memory location within a transaction of a first thread, the shared memory location being accessible by the first thread and a second thread, the method comprising:
    identifying an enlistment record associated with the shared memory location wherein the enlistment record is a control structure for direct-update software transactional memory accesses associated with the shared memory location;
    marking the enlistment record to reserve the shared memory location for the transaction, if the enlistment record indicates no conflict with a write memory access to the shared memory location by the second thread;
    recording a reference to the shared memory location and its contents in an undo log; and
    writing a new version value to the enlistment record of the shared memory location at termination of the transaction.

2. The method of claim 1 further comprising:
    performing within the transaction a write memory access to the shared memory location, responsive to the marking operation.

3. The method of claim 1 wherein the marking operation comprises:
    writing a transaction identifier to the enlistment record, the transaction identifier identifying the transaction of the first thread.

4. The method of claim 1 wherein the enlistment record indicates a conflict by a write memory access to the shared memory location by a second thread, if the enlistment record is marked by the second thread.

5. A method of managing memory access to a shared memory location within a transaction of a first thread, the shared memory location being accessible by the first thread and a second thread, the method comprising:
    identifying an enlistment record associated with the shared memory location;
    marking the enlistment record to reserve the shared memory location for the transaction, if the enlistment record indicates no conflict with a write memory access to the shared memory location by the second thread;
    recording a reference to the shared memory location and its contents in an undo log, wherein the undo log includes an ordered sequence of shared memory location references and associated contents; and writing the contents to the associated shared memory locations, wherein individual write accesses are performed in reverse order in the sequence.

6. The method of claim 1 further comprising:
recording a transaction log entry including a reference to the enlistment record, the transaction log entry being recorded in a transaction log containing transaction log entries of a plurality of write memory accesses within the transaction.

7. The method of claim 1 further comprising:
if the enlistment record indicates a conflict by a write memory access to the shared memory location by the second thread, resolving the conflict to allow a write memory access to the shared memory location within the transaction of the first thread.

8. A method of managing memory access to a shared memory location within a transaction of a first thread, the shared memory location being accessible by the first thread and a second thread, the method comprising:
identifying an enlistment record associated with the shared memory location;
reading a version value from the enlistment record;
marking the enlistment record to reserve the shared memory location for the transaction, if the version value of the enlistment record indicates no conflict with a write memory access to the shared memory location by the second thread; and
writing a new version value to the enlistment record of the shared memory location.

9. A method of managing memory access to a shared memory location within a transaction of a first thread, the shared memory location being accessible by the first thread and a second thread, the method comprising:
identifying an enlistment record associated with the shared memory location;
reading contents of a version field from the enlistment record; and
marking the enlistment record to reserve the shared memory location for the transaction, if the contents of the version field of the enlistment record indicate no conflict with a write memory access to the shared memory location by the second thread, wherein the marking operation comprises:
recording contents of the version field in a scratch field; and
writing a transaction identifier into the version field.

10. A computer-readable medium having computer-executable instructions for performing a computer process implementing the method of claim 1.

11. A method of managing memory access to a shared memory location within a transaction of a first thread, the shared memory location being accessible by the first thread and a second thread, the method comprising:
identifying an enlistment record associated with the shared memory location;
reading contents of a version field of the enlistment record;
generating a transaction log entry associated with the transaction, the transaction log entry referencing the enlistment record associated with the shared memory location;
executing the read memory access to the shared memory location within the transaction by the first thread; and
committing the transaction to the read memory access, if the transaction log entry and the contents of the version field of the referenced enlistment record do not indicate a conflict by a write memory access to the shared memory location by the second thread, responsive to the executing operation.

12. The method of claim 11, further comprising:
if the contents represent a transaction identifier of the first thread, acknowledging that the transaction log entry for the enlistment record has already been generated within the transaction.

13. The method of claim 11, further comprising:
if the contents represent a transaction identifier of the second thread, aborting the transaction.

14. The method of claim 11, further comprising:
if the contents represent a version value, recording the version value in the transaction log entry.

15. A method of managing memory access to a shared memory location within a transaction of a first thread, the shared memory location being accessible by the first thread and a second thread, the method comprising:
identifying an enlistment record associated with the shared memory location;
generating a transaction log entry associated with the transaction, the transaction log entry referencing the enlistment record associated with the shared memory location;
executing the read memory access to the shared memory location within the transaction by the first thread; and
committing the transaction to the read memory access, if the transaction log entry and the referenced enlistment record do not indicate a conflict by a write memory access to the shared memory location by the second thread, responsive to the executing operation; and further comprising:
identifying a conflict by a write memory access to the shared memory location by the second thread, if a version value recorded in the transaction log entry does not match a version value recorded in the enlistment record at the time of commitment.

16. The method of claim 15 further comprising:
aborting the transaction, if a conflict is identified.

17. A method of managing memory access to a shared memory location within a transaction of a first thread, the shared memory location being accessible by the first thread and a second thread, the method comprising:
identifying an enlistment record associated with the shared memory location, wherein the enlistment record includes a version field;
generating a transaction log entry associated with the transaction, the transaction log entry referencing the enlistment record associated with the shared memory location;
executing the read memory access to the shared memory location within the transaction by the first thread; and
committing the transaction to the read memory access, if the transaction log entry and the referenced enlistment record do not indicate a conflict by a write memory access to the shared memory location by the second thread, responsive to the executing operation; and further comprising:
reading from a scratch field associated with the enlistment record a version value previously stored in the version field of the enlistment record; and
identifying a conflict by a write memory access to the shared memory location by the second thread, if a version value recorded in the transaction log entry does not match the version value recorded in the scratch field at the time of commitment.

18. A computer-readable medium having computer-executable instructions for performing a computer process implementing the method of claim 11.

19. A method of managing memory access to shared memory locations within a transaction of a first thread, the shared memory locations being accessible by the first thread and a second thread, the method comprising:

enlisting the shared memory locations within the transaction;

maintaining a transaction log including a transaction log entry associated with the transaction and an enlistment record for each shared memory location;

maintaining an undo log including entries of write memory accesses to the shared memory locations, each entry including an address associated with a shared memory location of the write memory access and prior contents of the shared memory location;

performing memory accesses directly to the shared memory locations; and committing the transaction to the memory accesses, responsive to the performing operation, if no conflict by a write memory access to the shared memory location by the second thread is detected, wherein a conflict by a write memory access to the shared memory location by the second thread is detected when a version value recorded in the transaction log entry does not match a version value recorded in the enlistment record.

20. A computer-readable medium having computer-executable instructions for performing a computer process implementing the method of claim 19.

21. A computer-readable medium having computer-executable instructions for performing a computer process implementing the method of claim 8.

22. A computer-readable medium having computer-executable instructions for performing a computer process implementing the method of claim 9.

23. A computer-readable medium having computer-executable instructions for performing a computer process implementing the method of claim 15.

24. A computer-readable medium having computer-executable instructions for performing a computer process implementing the method of claim 17.

* * * * *